United States Patent [19]

Frank

[11] Patent Number: 5,099,781
[45] Date of Patent: Mar. 31, 1992

[54] FLUID RESISTANT SPINDLE DRIVE MOTOR

[76] Inventor: Craig D. Frank, 3735 Girard Ave. N., Minneapolis, Minn. 55412

[21] Appl. No.: 629,078

[22] Filed: Dec. 17, 1990

Related U.S. Application Data

[63] Continuation of Ser. No. 351,328, May 4, 1989, abandoned, which is a continuation of Ser. No. 926,019, Oct. 31, 1986, abandoned.

[51] Int. Cl.$^5$ ............................................. B05C 11/02
[52] U.S. Cl. ........................................ 118/52; 310/88; 310/89; 310/157; 310/248; 279/158; 384/473; 403/23
[58] Field of Search ..................... 310/87-89, 310/242-248, 112-114, 157, 91; 118/52, 54, 56; 29/569.1; 464/52, 170; 403/23; 277/53, 67; 279/1 ME; 384/473, 480

[56] References Cited

U.S. PATENT DOCUMENTS

| 1,490,205 | 4/1924 | Chatto | 310/91 |
| 1,970,604 | 8/1934 | Henry | 310/247 |
| 2,011,341 | 8/1935 | Mendenhall et al. | 310/87 |
| 2,194,620 | 3/1940 | Sekyra | 310/247 |
| 2,404,635 | 7/1946 | Hoover | 310/87 X |
| 3,203,356 | 8/1965 | Ruby | 310/91 |
| 3,339,098 | 8/1967 | Burrows et al. | 310/247 X |
| 3,445,705 | 5/1969 | Fuller et al. | 310/247 |
| 3,862,856 | 1/1975 | Shipman | 118/52 |
| 4,640,846 | 2/1987 | Kuo | 118/52 |
| 4,689,511 | 8/1987 | Baker | 310/88 |

FOREIGN PATENT DOCUMENTS 0159535 9/1983 Japan .................. 118/52

OTHER PUBLICATIONS

"The Kasper System 4500", The Photolithography Co., Eaton, Sunnyvale, Ca.
"LSI Series 45/50/60", Eaton, Crystal, MN.
"Bruch Holders", I.T.T. Thermotech, Hopkins, M.N.
"Phoenix Catalog No. 80", Phoenix Electric Mfg. Co., Chicago, IL.

*Primary Examiner*—R. Skudy
*Attorney, Agent, or Firm*—Merchant, Gould, Smith, Edell, Welter & Schmidt

[57] ABSTRACT

A wafer spinning assembly for use in wafer processing includes a chuck for holding a wafer, a vertically oriented spindle connected to drive the chuck, and a spindle drive motor. The spindle drive motor includes an enclosed cylindrical housing which is enclosed on a top end with a top end cap having an outside surface impermeable to infiltration by wafer processing solutions. A drive shaft is mounted inside the housing for rotational movement and out an unsealed aperture in the top end cap. A motor mounted inside the housing provides electromotive rotational force to the shaft in response to electric power supplied to the motor through a plurality of brush assemblies. The top end cap includes a cylindrical collar portion extending outwardly from the outside surface, oriented generally horizontally, of the top end cap and around the shaft. The motor is deployed so that the shaft is actually aligned with the spindle. A spindle coupler on an end of the shaft couples the shaft to the spindle, caps the end of the shaft and has a cylindrical hood portion having an inside diameter greater than the outside diameter of the collar. The shaft and the coupler are sized so that the hood portion surrounds the collar to prevent wafer processing solutions from entering the housing through the unsealed shaft aperture. The collar portion extends outwardly enough to prevent wafer processing solutions from draining into the housing through the shaft aperture.

3 Claims, 7 Drawing Sheets

FLUID RESISTANT SPINDLE DRIVE MOTOR

This is a continuation of application Ser. No. 351,328, filed May 4, 1989, now abandoned.

This is a continuation of application Ser. No. 926,019, filed Oct. 31, 1986, now abandoned.

TECHNICAL FIELD OF THE INVENTION

The present invention pertains generally to the field of electric servo motors, and more particularly to spindle drive servo motors as used in semiconductor wafer processing equipment.

BACKGROUND OF THE INVENTION

Several steps in semiconductor wafer processing require the uniform distribution of a processing solution over the surface of a wafer being processed. In particular, photoresist, developer and scrubbing solutions must be applied to the wafer reiteratively during the process of doping the wafer to produce semiconductor circuits. In order to assure complete and uniform coverage of the wafer surface the solutions are applied to the wafer and the wafer is then spun on a chuck. The centrifugal force of the spinning solution spreads it evenly over the surface of the wafer. Such apparatus is found, for instance, in the commercially available models LSI 45/50/60/ and Kasper System 4500 wafer processing equipment currently available from Eaton Corporation, Microlithography Systems Division, 4001 North First Street, San Jose, CA 95134.

As generally illustrated in FIG. 9, wafer processing equipment 1 typically employs a servo motors for spinning the wafer. The motors are deployed in an upright position, the motor vertically oriented, and the motor shaft is coupled to a spindle 2 which accommodates a chuck 3 which is a fixture to secure the wafer. The chuck includes an aperture in fluid communication with the interior of the spindle shaft via which a vacuum force is to be applied to hold a wafer on the chuck. Thus, these motors are typically termed "spindle drive motors."

SUMMARY OF THE INVENTION

I have discovered that spindle drive motors used in wafer processing equipment fail prematurely because of the infiltration of processing solution into the motor bearings and brush holder assemblies, causing bearing failure and commutation problems. Accordingly, I have provided a fluid resistant spindle drive motor design. The wafer processing spindle drive motor includes a cylindrical housing having a top end cap enclosing the top end of the housing. A drive shaft is mounted inside the housing for rotational movement and extends out an operature in the top end cap. Motor means are mounted inside the housing for providing electromotive rotational force to the shaft in response to electric power supplied thereto through a plurality of brush assemblies. The top end cap includes a cylindrical collar portion extending upwardly and around the shaft. A spindle coupler is mounted on the end of the shaft and has a cylindrical hood portion having an inside diameter greater than the outside diameter of the collar. The shaft and the coupler are sized so that the hood portion longitudinally coextends with the collar. Thus, the present invention deflects procession solutions away from the shaft aperature to keep it out of the housing.

According to another aspect of the invention there is provided a brush assembly for a wafer processing spindle drive motor. The assembly includes a cylindrical body portion including an electrical connector extending therefrom. The body portion is encapsulated in a nonconductive material with the electrical connector extending outwardly from the material. The body portion includes internal threading on one end with the other end forming a brush channel. A threaded body cap for capping the threaded end of the body is provided and is encapsulated in nonconductive material and includes a cylindrical hollow interior portion. A carbon brush is provided and is connected to a diskshaped brush through a shunt wire. The brush cap is sized to fit inside said hollow interior portion of said cap. A spring is disposed around the shunt wire between the brush cap and the brush, and the brush cap, shunt wire, spring and brush are disposed within the body with the brush cap adjacent the interior of said body cap so that the brush slides in the channel.

These and other salient features of the invention, along with more subtle aspects thereof, are shown and described in detail in the ensuing specification and drawings.

DETAILED DESCRIPTION OF THE INVENTION

Figure 1:
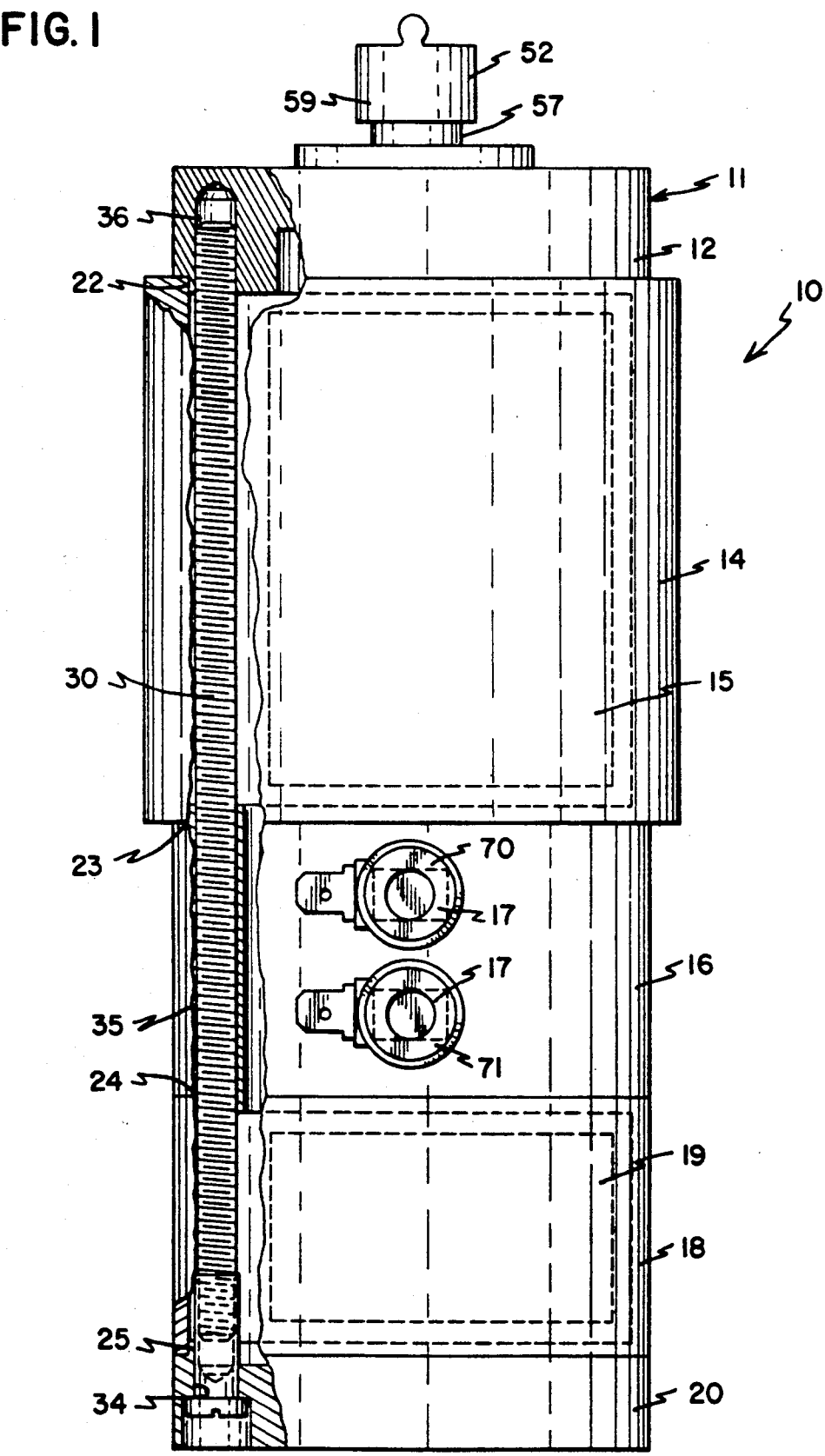
FIG. 1 is a partially cut away side view of the spindle drive motor according to the present invention.

Referring now to FIGS. 1-5, throughout which the same elements bear the same reference numerals, the spindle drive motor and according to the present invention will be generally described. Spindle drive motor 10 includes a cylindrical housing 11 which encompasses three separate housing members 14, 16 and 18, capped on either end with cap members 12 and 20. Housing members 14 and 18 are made of steel that is plated with nickel and post plated with chrome, while members 12, 16 and 20 are anodized aluminum. Preferably, members 12, 14, 16, 18 and 20 are fitted overlappingly as illustrated at 22, 23, 24 and 25. Optionally, lap fittings 22, 23, 24 and 25 may include o-ring seals. The housing members are held together with a pair of longitudinally extending threaded rods 30 and 32. As shown with respect to rod 30, each rod extends through a throughhole 34 in end cap member 20, through another through-hole 35 in housing member 16, and is screwed into a blind threaded hole 36 in top end cap member 12. Optionally, an o-ring may be used to seal the interface between the head of the threaded rod and end cap member 20. Motor components 15, commutators 17 and tachometer components 19 are schematically indicated as generally disposed within housing members 14, 16 and 18, respectively. For the sake of brevity, the motor and tachometer assemblies are not shown in detail in the drawings. It shall be understood that the design of the omitted components is not essential to the servo motor of the present invention, and that any conventional components may be employed, as are well known in the servo motor art. Although the servo motor of the present invention uses a tachometer feedback mechanism, it shall be understood that optical or digital encoders of the like could also be utilized to provide the required feedback.

Figure 2:
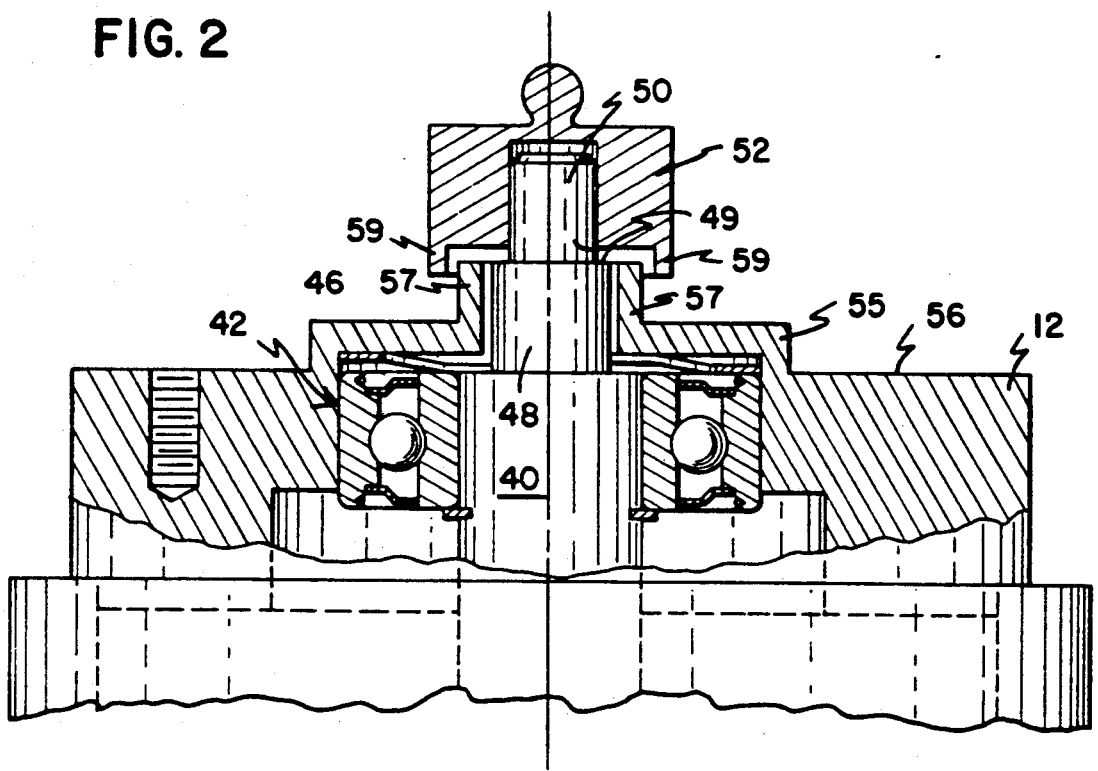
FIGS. 2 and 3 are cross-sectional views of the top and bottom ends, respectively, of the spindle drive motor of FIG. 1.
Figure 3:
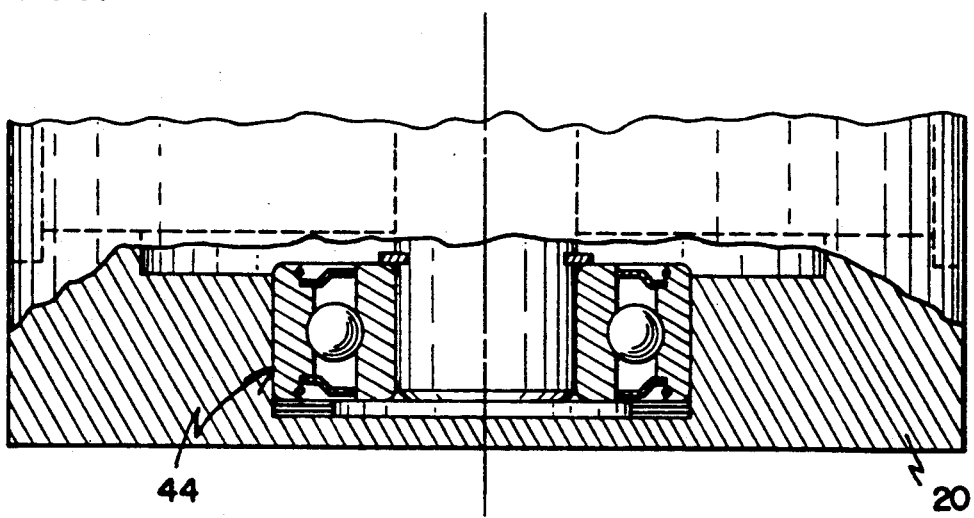

As may be seen best in FIGS. 2 and 3, drive motor 10 includes a motor shaft 40 which is mounted for rotational movement inside housing at the top and bottom of the housing. Radial ball bearing assemblies 42 and 44 mount the shaft 40 to the top and bottom end caps, respectively. A spring washer 46 provides a preloading force on the outer race of the bearing 42. Shaft 40 has two step-down diameters 48 and 49, and an end 50, to which is mounted a male coupler 52 for coupling to a spindle shaft. Preferably, end 50 includes one or more flats 53 (FIG. 4) against which set screws 54 and 55 are tightened to fix coupler 52 to the end 50 of shaft 40.

Figure 4:
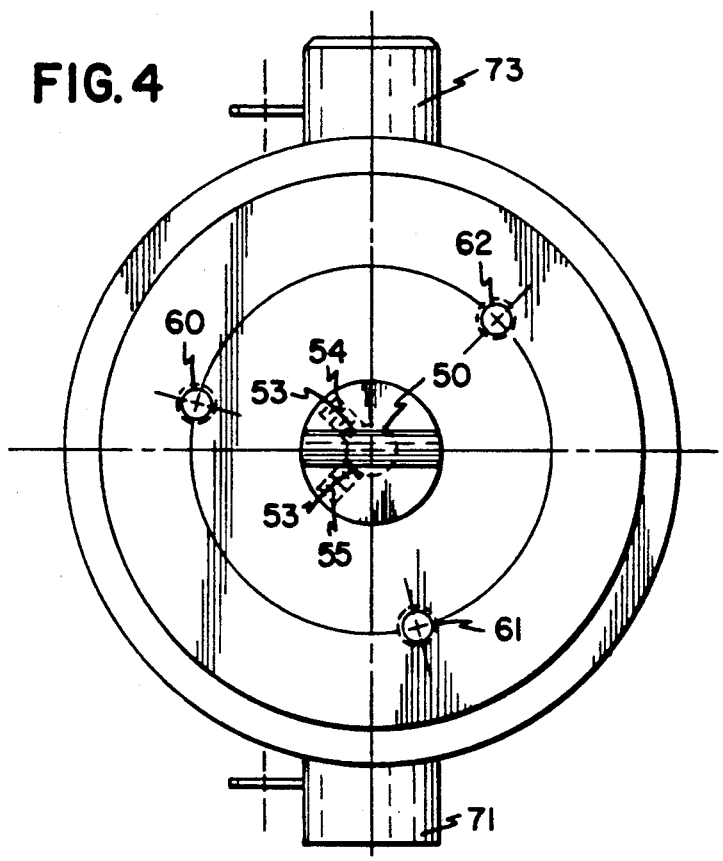
FIGS. 4 and 5 are top and bottom plan views of the spindle drive motor of FIG. 1.

As shown in FIGS. 2 and 4, end cap member 12 includes a piloting diameter 55 and a collar 57. As illustrated, coupler 52 includes a complimentary: hood 59 which extends down around collar 57. When motor 10 is mounted in its upright operative position, coupled to a spindle, hood 59 acts to deflect fluid away from the opening of collar 57 where the shaft exists the end cap member 12 to prevent processing fluids from entering the interior components. End cap member 12 also includes three blind threaded holes 60, 61 and 62. Holes 60-62 are provided to receive mounting screws from the spindle assembly whereby the motor 10 is mounted in an upright suspended position for operation.

Figure 5:
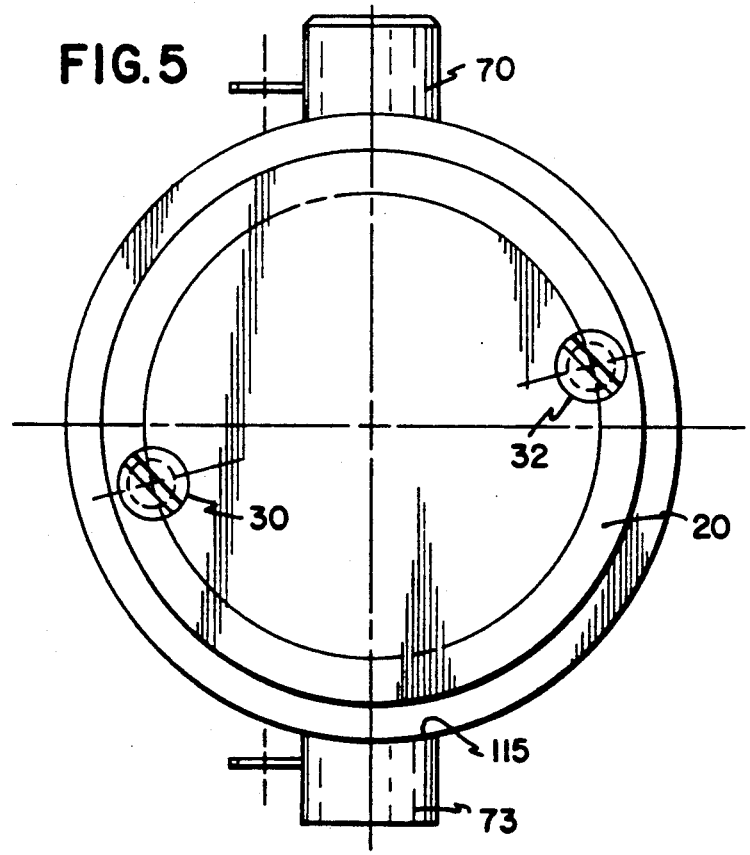

As may be best seen with respect to FIGS. 1, 4 and 5, motor 10 includes four brush holder assemblies 70-73 mounted in pairs on opposite sides of housing member 16. Generally, as is well known in the art, assemblies 70-73 each carry a carbon brush element which makes contact with a corresponding commutator on the motor shaft. One pair of assemblies is provided to operate the motor drive components, while the other pair provide the tachometer output signal.

Figure 6:
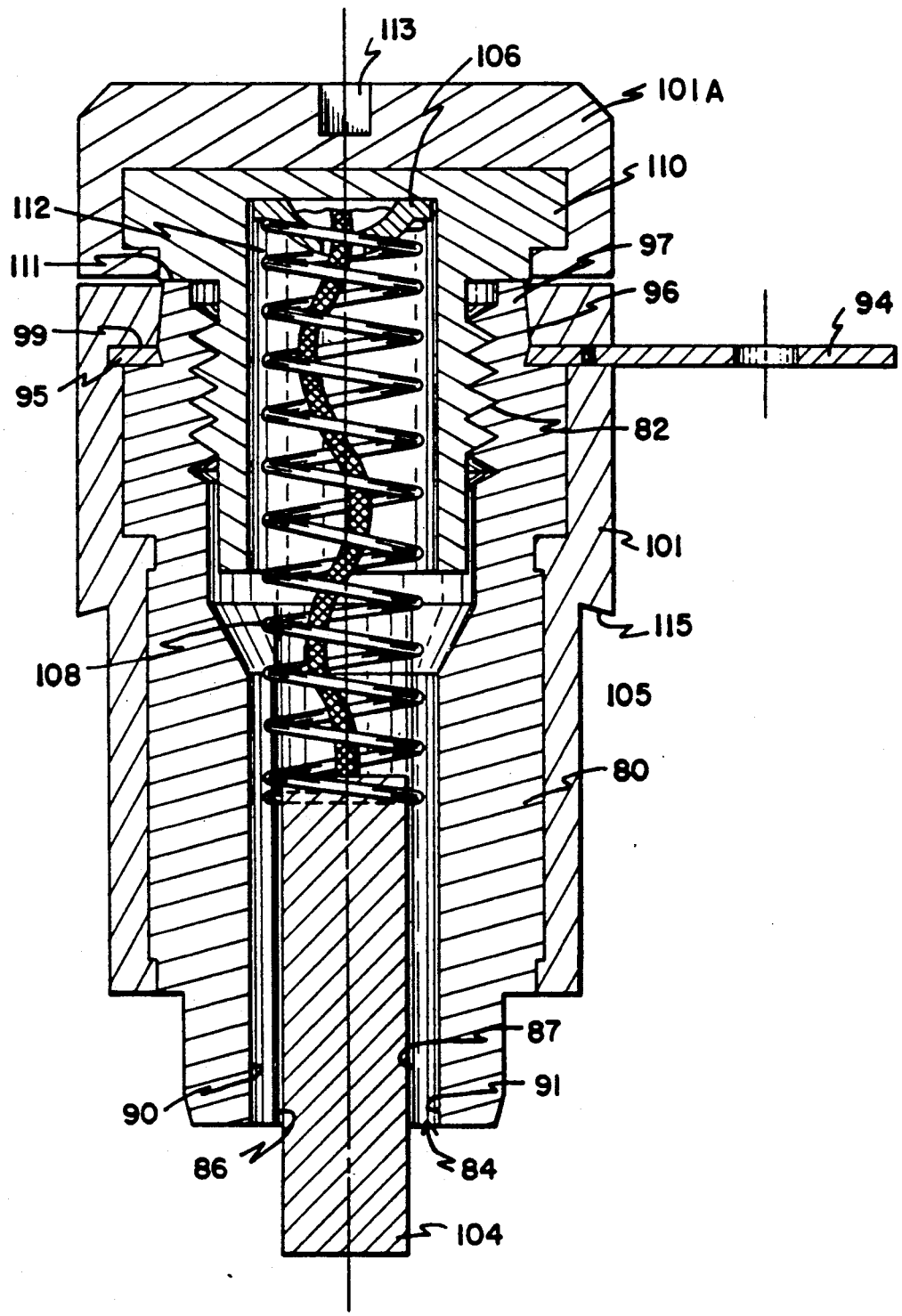
FIG. 6 is a cross-sectional view of the brush holder assembly of the spindle drive motor of FIG. 1 according to the present invention.
Figure 7:
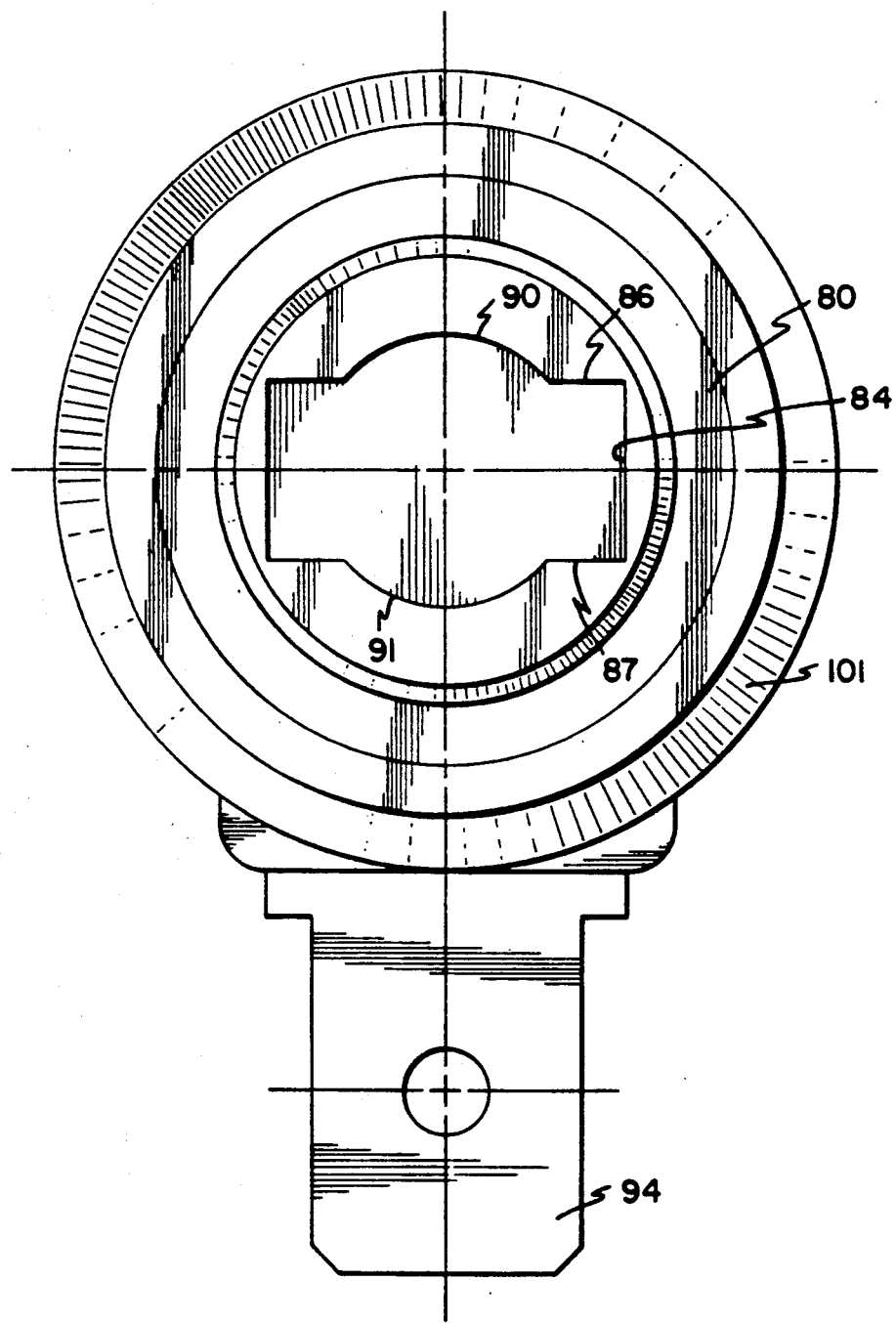
FIG. 7 is a bottom plan view of the brush holder assembly of FIG. 6.

As may be best seen with respect to FIGS. 6 and 7, each of brush holder assemblies 70-73 includes a cylindrical brass body 80 having an internally threaded end 82. The other end of body 80 has broached channel 84 to accommodate brush 80. Channel 84 has a generally rectangular cross section (FIG. 7), with opposing walls 86 and 87 of the channel including cylindrical trough portions 90 and 91, respectively. A metal tab 94 protrudes from body 80 and forms the male portion of a push-on connector. Tab 94 includes a washer-shaped portion 95 which is a pressed fit over the exterior end of body 80. Preferably, body 80 includes a tapered portion 96 of slightly enlarged diameter located between the end 97 and shoulder 99 of body 80. Washer 95 is sized for an interference fit over the tapered portion 96 to ensure a good mechanical and electrical interface and to hold the tab 94 on the end of the body 80. During assembly of a brush holder, portion 95 is pressed on body 80 (before it is encapsulated in nonconductive molding compound as described below) and both are plated with about 0.000050" gold, in order to enhance the conductivity of body 80 and tab 94, to help in forming a good electrical connection between it and the tab and the body and to improve resistance to corrosion. Once the plating is finished, body 80 and the washer portion 95 are encapsulated in nonconductive molding compound 101. A threaded brass brush holder cap 110 having a head portion and a threaded cylindrical portion, also gold plated and also encapsulated in a nonconductive molding compound 101a is screwed into the threaded end of body 80. Cap 110 includes a hollow cylindrical interior 112. A slot 113 is provided in the encapsulating material 101a to allow it to be turned with a device such as a screwdriver. When cap 110 is tightened down, it seats on the lip 111 of body 80 to provide a mechanical seal.

Mounted for axial movement in channel 84 is a carbon brush 104, the outwardly extending end of which is for contacting a corresponding commutator on the motor shaft 40. A shunt wire 105 is tamped or molded to the interior end of brush 104. On its other end wire 105 is connected to a gold plated brush cap 106 which has a concave portion 107. Preferably, shunt wire 105 is inserted into an aperature in the bottom center of concave portion 107 and is soldered to the brush cap within the cavity thereof portion 107. A spring 108 is disposed around shunt wire 105 between cap 106 and brush 104. Cap 106 thus presses on the interior end of cap 110 to provide an outwardly biasing force through spring 108 on brush 104 to force it against the commutator. Thus, an electrical contact is made from tab 94, through the body 80, cap 110, and the brush cap 106, and on througn the shunt wire 105 to the brush 104. As shown in FIG. 6 spring 108 is in a slightly compressed condition, as if brush 104 was pressing against a commutator. Thus, the present invention allows a brush to be replaced while the brush holder assembly is mounted to the motor housing member 16.

As an alternative to shunt wire 105 and brush cap 106, the present invention provides that the electrical connection between the brush holder cap and the brush can be provided through a conductive spring. Accordingly, the shunt wire and the brush cap can be eliminated. Presently, the best-known conductive spring material is known as Cortem ® and is available from Toledo Cummutator, Division of Electronic Technologies, Inc. or 1101 South Chestnut Street, Owosso, MI 48867. The Cortem ® spring are believed to be made of copper-clad 17-7 PH stainless steel wire.

Housing member 16 includes aperatures sized to receive each of brush holder assemblies 70-73 for mounting. As may be best seen in FIG. 6, each assembly has a shoulder 115 which shoulders against the outer wall of the housing member 16 when the assembly is mounted. Preferably, the assemblies are held in place with a set screw and a sealant is applied around the mounted assemblies and the set screw. Preferably, an electrical varnish sealant such as GLPT is used. Optionally, an o-ring seal may be used on the body of the brush holder assembly to seal between it and the housing member 16.

Figure 8:
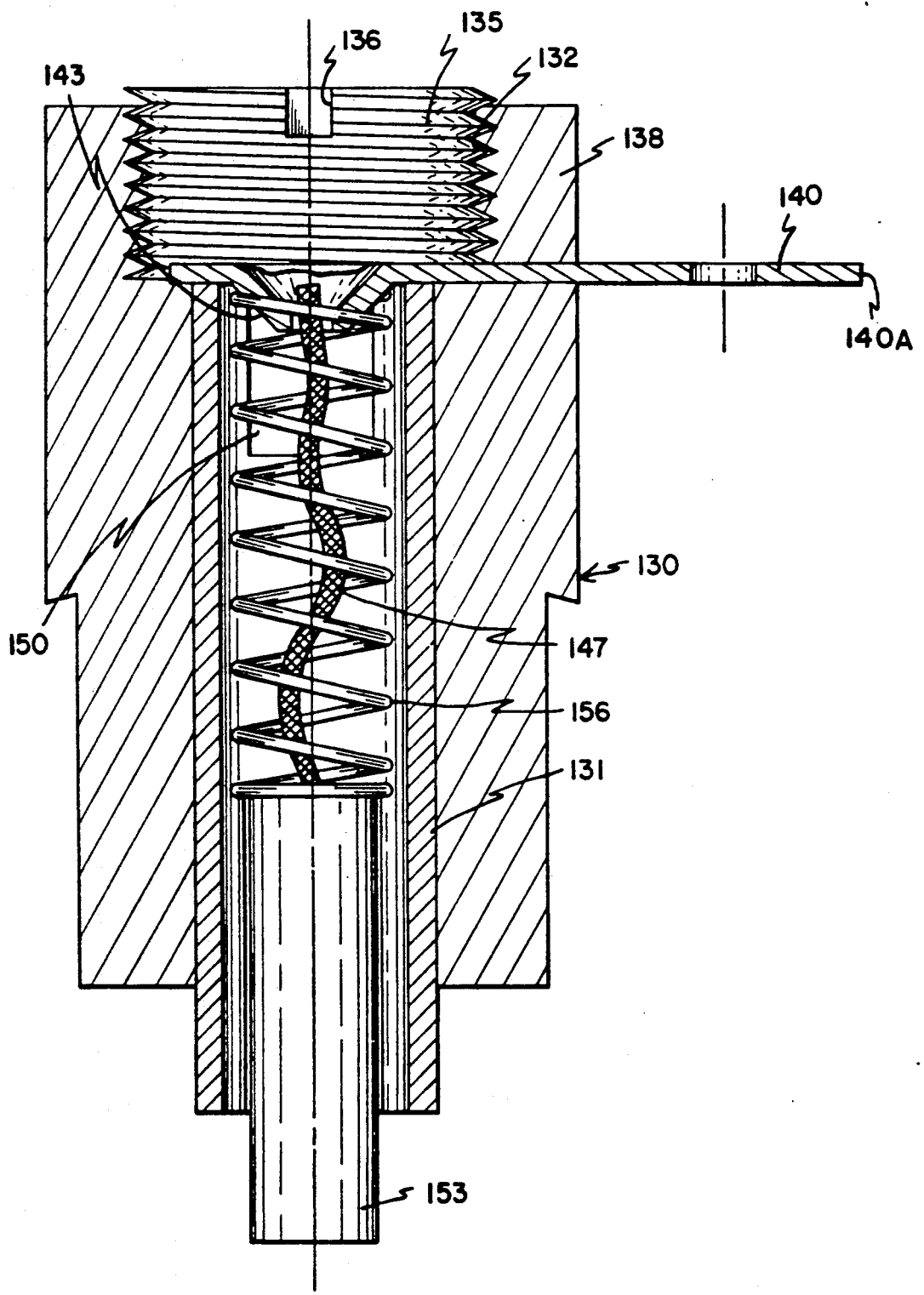
FIG. 8 is a cross-sectional view of a prior art brush holder assembly for a spindle drive motor.

Referring now to FIG. 8 there is shown a prior art brush holder assembly. Prior art assembly 130 includes a threaded plastic head 132 having a brass insert 131 providing a channel of generally the same cross section as described above with respect to channel 84. The plastic head is formed to include an internal threading 132 on one end in which is screwed a plastic brush holder cap 135. Plastic brush holder cap 135 includes a slot 136 for a device such as a screwdriver. A slot 138 is cut out of one side of the plastic encapsulation, and a brush cap 140 that is so constructed as to have the capability to accept a female push-on connector extends on end 104a through the slot and rests on the top edge of insert 131. Brush cap 140 has concave portion 143 to which a shunt wire 147 is connected. Brush cap 140 further includes a pair of ears, of which only ear 150 is shown, which are opposite one another and extend downwardly into the top of the channel formed by insert 131. Ears 150 position the cap with respect to the brass insert. Thus, brush cap 140 is sandwiched between cap 135 and the top of insert 131, with the brush 153 biased outwardly by the force of spring 156.

I have discovered that processing solutions infiltrate prior art servo motors in several places. First, owing to the upright motor position solutions are splashed over the top end of the motor. In prior art motors, lacking the features of the present invention, the solutions entered the top of the motor in several ways. First, solutions would leak into the top motor bearings through the aperature for the motor shaft. Secondly, prior art motors employ "through" threaded holes for receiving the mounting screws as opposed to the blind holes 60-62 utilized in the present invention. It was discovered that maintenance personnel would often only use two of the mounting screws, thus leaving one threaded hole open to leak the solution into the motor. Thirdly, in certain prior art motors the top end cap includes counterbores for countersinking the screw head or nut used to secure the cap to the rest of the housing. It is believed that solution pooling in the reservoirs created by the countersunk screws tends to leak past the screw head and into the motor frame.

Solution entering the housing in any of the abovenoted ways, but particularly via the shaft aperature, eventually work its way into the bearings, particularly the top bearing. The solutions enter and contaminate the bearing grease which is packed in the bearings. In all three cases, the infiltration of processing solutions into the bearings results in premature failure.

I have also discovered that processing solutions infiltrate prior art motors through the brush holder assemblies. Referring to FIG. 8, it is believed that the location of infiltration is along brush cap 140, along where it extends between slot 138 and cap 135. In particular, it is believed that solutions enter the slot 138 and pass through the passages formed where the brush cap 140 exists the brush holder assembly.

The motor of the present invention solves the abovenoted infiltration problems and thus provides a wafer processing motor less susceptible to premature failure. It particular, the hood 59 and collar 57 act to deflect processing solution away from the shaft opening in the end cap 12 without the use of rubber seals which are susceptible to decomposition and failure when exposed to corrosive processing solutions such as photo resist, and which have an unwanted tendency to reduce motor acceleration.

Further, the design of the present invention eliminates the possibility of solution infiltration through the mounting threaded holes and housing frame throughscrews, by providing blind mounting bolt holes and eliminating the necessity for counterbores on surface 56 on the top of end cap 12.

The brush holder assembly of the present invention also provides a barrier to solution infiltration. The design of the assemblies assures a tight seal between brush cap 110 and brass body 80, and a tight seal around the tab 94 where it exits the assembly structure through molding material 101, which seals around the tab when molded on. Accordingly, the solution infiltration paths of the described prior art brush holder assemblies have been eliminated. Furthermore, the brush holder assembly of the present invention permits the carbon brushes to be readily replaced without disconnecting the female portion of the push-on wiring connector from the tab 94. This feature is particularly advantageous if wiring is soldered to the tab 94 because the tab is not connected to the brush, as is the case for the described prior art structure, which requires the soldered connection to be unsoldered from the wire.

Figure 9:
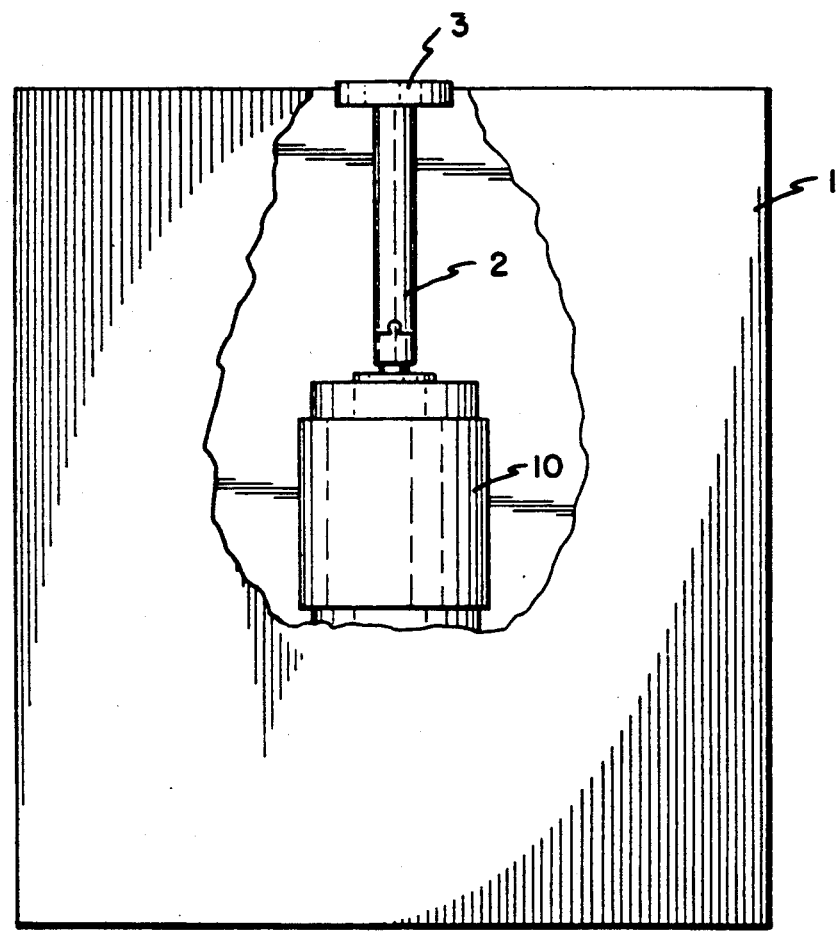
FIG. 9 is a cut-away diagrammatic illustration of wafer processing equipment according to the present invention.

Thus, there has been described above a fluid resistant drive motor for wafer processing equipment 1 (FIG. 9). Although the invention on has been described in its preferred form, those skilled in the art will readily appreciate that many modifications and additions may be made thereto without departing from the spirit and scope of the claims amended hereto.

What is claimed is:

1. A wafer spinning assembly for use in wafer processing comprising:
    a chuck for holding a wafer;
    a vertically oriented spindle connected to drive the chuck;
    a spindle drive motor including:
        (a) an enclosed cylindrical housing, said housing enclosed on a top end with a top end cap having an outside surface impermeable to infiltration by wafer processing solutions;
        (b) a drive shaft mounted inside said housing for rotational movement, said shaft extending out an unsealed aperture in said end cap;
        (c) motor means mounted inside said housing for providing electromotive rotational force to said shaft in response to electric power, said power being supplied to said motor means through a plurality of brush assemblies;
        (d) said top end cap including a cylindrical collar portion extending outwardly from said outside surface of said top end cap and around said shaft, said outside surface being oriented generally horizontally;
    said motor deployed so that said drive shaft is axially aligned with said spindle; and
    a spindle coupler fastener on an end of said shaft and coupling said shaft to said spindle, said coupler capping the end of said shaft to said spindle, said coupler capping the end of said shaft and having a cylindrical hood portion having an inside diameter greater than an outside diameter of said collar, said shaft and said coupler sized so that said hood portion surrounds said collar to prevent wafer processing solutions from entering the housing through said 2. The wafer spinning assembly according to claim 1 wherein this said top end cap includes a plurality of blind threaded holes for receiving mounting screws for mounting the motor.

3. The assembly according to claim 2 wherein said top end cap is fastened to said housing with at least one threaded rod screwed into a blind threaded hole on a side of said top end cap directed toward an interior of said housing, said threaded hole being blind so that said top end cap has no through holes.

* * * * *